(12) United States Patent
Liu

(10) Patent No.: US 9,581,524 B2
(45) Date of Patent: Feb. 28, 2017

(54) SINGLE-POINT CLAMP OF FOUR-WHEEL ALIGNER FOR VEHICLES AND A USING METHOD THEREOF

(71) Applicant: SHANGHAI YICHENG AUTO-INSPECTION DEVICE SCIENCE & TECHNOLOGY CO., LTD., Shanghai (CN)

(72) Inventor: Jindong Liu, Shanghai (CN)

(73) Assignee: Shanghai Yicheng Auto Inspection Device Science & Technology Co., Ltd., Shanghai (CN)

( * ) Notice: Subject to any disclaimer, the term of this patent is extended or adjusted under 35 U.S.C. 154(b) by 255 days.

(21) Appl. No.: 14/387,148

(22) PCT Filed: Mar. 22, 2013

(86) PCT No.: PCT/CN2013/073066
§ 371 (c)(1),
(2) Date: Sep. 22, 2014

(87) PCT Pub. No.: WO2014/121546
PCT Pub. Date: Aug. 14, 2014

(65) Prior Publication Data
US 2015/0048225 A1 Feb. 19, 2015

(30) Foreign Application Priority Data
Feb. 7, 2013 (CN) .......................... 2013 1 0048883

(51) Int. Cl.
*G01B 11/00* (2006.01)
*G01M 17/013* (2006.01)
(Continued)

(52) U.S. Cl.
CPC ......... *G01M 17/013* (2013.01); *B25B 11/002* (2013.01); *B60B 30/06* (2013.01);
(Continued)

(58) Field of Classification Search
CPC ................................ G01B 5/255; G01B 11/27
(Continued)

(56) References Cited

U.S. PATENT DOCUMENTS 3,520,064 A * 7/1970 Kushmuk .............. G01B 5/255
33/337
3,953,134 A * 4/1976 Appel .................. G01B 11/275
33/203.18
(Continued)

FOREIGN PATENT DOCUMENTS

| CN | 201173865 Y | 12/2008 |
|---|---|---|
| GB | 2025064 A | 1/1980 |
| KR | 10-2010-0129871 | 6/2009 |

*Primary Examiner* — Yaritza Guadalupe-McCall
(74) *Attorney, Agent, or Firm* — Rosenberg, Klein & Lee

(57) ABSTRACT

A single-point clamp of four-wheel aligner for vehicles connected to a fixing hub nut on the wheel comprises a sleeve, a single-point variable hexagonal grip, a fastening nut, a connecting board, and a target board with magnets. The single-point variable hexagonal grip and the fastening nut are respectively disposed at two ends of the sleeve. The single-point variable hexagonal grip is firmly lodged in the fixing hub nut. Two ends of the connecting board are respectively connected to the sleeve and the target board. A using method includes: (1) loosening the fastening nut of the single-point clamp; (2) inserting the single-point variable hexagonal grip into the fixing hub nut of the wheel; and (3) rotationally fastening the fastening nut for clamping the fixing hub nut firmly.

10 Claims, 6 Drawing Sheets

(51) Int. Cl.
*G01B 11/275* (2006.01)
*B25B 11/00* (2006.01)
*B60B 30/06* (2006.01)
*G01M 11/06* (2006.01)

(52) U.S. Cl.
CPC ........ *G01B 11/275* (2013.01); *B60B 2340/34* (2013.01); *B60B 2340/52* (2013.01); *B60B 2900/112* (2013.01); *B60B 2900/115* (2013.01); *B60B 2900/531* (2013.01); *G01B 2210/30* (2013.01); *G01M 11/067* (2013.01)

(58) Field of Classification Search
USPC ................ 33/203.18, 203.19, 203.2, 203.21
See application file for complete search history.

(56) References Cited

U.S. PATENT DOCUMENTS

| | | | | |
|---|---|---|---|---|
| 3,956,830 A * | 5/1976 | MacMillan | ............ | G01B 5/255 33/203.18 |
| 4,114,283 A * | 9/1978 | Spainhour | ............ | G01B 5/255 33/203.18 |
| 4,115,926 A * | 9/1978 | Hampton, Jr. | ....... | G01B 11/275 33/203.18 |
| 4,176,463 A * | 12/1979 | Ringle | ................... | G01B 5/255 33/203.18 |
| 4,803,785 A | 2/1989 | Reilly | | |
| 4,967,480 A * | 11/1990 | DeLuca | ................. | G01B 5/255 33/203.18 |
| 5,056,231 A | 10/1991 | Alusick et al. | | |
| 5,471,754 A * | 12/1995 | Mieling | ................. | G01B 5/255 33/203.18 |
| 5,535,522 A * | 7/1996 | Jackson | ............. | G01B 11/2755 33/203.18 |
| 5,546,665 A * | 8/1996 | Jackmauh | ............. | G01B 5/255 33/203.18 |
| 5,724,743 A * | 3/1998 | Jackson | ............. | G01B 11/2755 33/203.18 |
| 6,226,879 B1 * | 5/2001 | Baird | .................. | G01B 11/275 33/203.18 |
| 6,282,799 B1 | 9/2001 | Warkotsch | | |
| 6,507,988 B1 * | 1/2003 | Riviere | .................. | G01B 5/255 33/203.18 |
| 6,684,516 B2 * | 2/2004 | Voeller | ................... | G01B 5/255 33/203 |
| 7,185,438 B2 * | 3/2007 | Paulsen | ................. | G01B 5/255 33/203 |
| 7,444,753 B1 * | 11/2008 | Howe | .................... | G01B 5/255 33/203.18 |
| 8,830,119 B2 * | 9/2014 | Borruso | ................. | G01S 7/4972 33/288 |
| 2002/0189114 A1 * | 12/2002 | Voeller | ................... | G01B 5/255 33/203.18 |
| 2005/0115088 A1 * | 6/2005 | Paulsen | ................. | G01B 5/255 33/203.18 |
| 2013/0239420 A1 * | 9/2013 | Kroll | ................... | G01B 11/275 33/228 |

* cited by examiner

SINGLE-POINT CLAMP OF FOUR-WHEEL ALIGNER FOR VEHICLES AND A USING METHOD THEREOF

BACKGROUND OF THE INVENTION

1. Field of the Invention

The present invention relates to a field of vehicle testing technique, particularly to a 3D single-point clamp of four-wheel aligner for vehicles and a method of using the same.

2. Description of the Related Art

The trade of domestic automobile maintenance and repair equipment develops rapidly in recent years and gradually becomes a leading enterprise among some trades. Some people with breadth of vision focus on the foreign market and develop the business in overseas markets by cooperating with agents or setting representative offices. Consequently, such tendency in accordance with the position of China in the world economic state is formed and becomes the major growing way of fast development of automobile repair trade in the future. Due to the progressive development of the vehicle market in China, the prospects of after-sales service of vehicle in China are also focused attentively, which benefits the automobile repair market greatly. Because the ratio of household car purchases is increased, and the consciousness of the vehicle owner to the vehicle maintenance and repair is more intensive, more and more demand of vehicle detection, maintenance and repair equipment for domestic vehicles is needed.

However, the present techniques of domestic maintenance and repair equipment fall far behind the nationwide rivals, and the domestic technique mainly imitates the foreign techniques. The four-wheel aligner is one of major products among the automobile maintenance and repair equipment and has a big demand of the market, a product technique with high difficulty, and a high added value. As the nation subjects the traffic security to an increased attention and stipulations of management, the market demand of four-wheel aligners will rapidly expand under the guidance of the national policies.

The common detecting methods of four-wheel aligners in the present market mainly comprises: laser, PSD, CCD, and 3D; the characteristics thereof are as follows:

1. Laser:

Laser is a new light source which is used as a light source for system measurement and is applied to the four-wheel aligner. Laser is exported by vertical straight lines, which causes a narrower measuring range determining the speed of the laser products, has zero compensation, and needs to calculate the thrust line manually. As a result, the accuracy of measurement is low and the detecting speed is slow. Because of the light spots and the scales, the artificial error is existed, and the laser is apt to be interfered by the outer environment. Accordingly, it is not ideal to apply the laser as a light source to the four-wheel aligner.

The laser is known as the affair which has the certain harm to the vision of human, so the security certification, e.g. UL, CE and so on, is not easily granted. The laser has been eliminated in Europe, America, and Japan; however, it is still used in some countries, such as China and part of Southeast Asia nations.

2. PSD:

PSD is also called "Position Sensitive Detectors". As everyone known, PSD is not used in four-wheel aligners in almost all the foreign countries. It is only used greatly in the machinery of Korea. The working principle of PSD is that while a position of a light receiving face of the PSD surface is illuminated, the output current changes correspondingly to obtain an illumination location. PSD is a component of simulation for DC/AC conversion having the circumstance of losing data. Although some special techniques can be used to avoid the drawbacks to a certain extent, the PSD can only measure a single light source in principle. The PSD can only be used in the industrial environment, namely, the temperature of the PSD drifts seriously and the PSD is apt to be affected by the light of the environment. The changes of temperature make the output zero position vary in a range of tens of millivolts, and the influence of light makes the value captured by the system become unstable. With the two drawbacks, the PSD loses the measuring accuracy and the stability of equipment. The inaccuracy and the poor repetition degree are the most serious defects of the PSD.

3. CCD:

CCD, a semiconductor digital device which is also called "charge coupled device", is divided into a linear CCD and an area CCD. The CCD is a new semiconductor-integrated photoelectric device developed in early seventieth of the twentieth century. Thousands of respective photosensitive units are gathered on a silicon surface. While the light illuminates on the photosensitive surface, the photosensitive units illuminated by lights gather the photoelectrons and output the light quantity by shifting to generate the information of the light position and the light intensity. As a result, the COD provides the characteristics of obtaining high measuring accuracy within 0.05 degrees, having no temperature coefficient, and attaining a long duration of the use.

The use of CCD can obtain a preferable adaptability of the environment. Other techniques have a variety of restrictions in use, for instance, they cannot be used in some environments, such as at the place with complicated lights, in a magnetic field with the powerful electricity, and in a room with a great variation of temperature. The above environments belong to typical environments of the ordinary automobile repair workshop. The requirement which forbids the open of doors and windows, has different measurement data between the cool morning and the hot noon, and forbids a big electric machinery to be set nearby is too over for the four-wheel aligners. Consequently, the four-wheel aligners produced by Europe and America adopt the CCD technique, for instance, TANK, BEISSBARTH, and ARES, which are enough to illustrate the advantages of the CCD products.

4. 3D:

The measuring method of 3D is to use the technique of graphic identification which is executed by collecting graphic data on the reflecting board disposed on the wheel by a CCD digital camera to measure the relative accuracy of the wheel and pushing the wheels backwards and forwards manually to allow the head of the CCD to collect the data and find out the coordinate and the angle of the wheel. This is a considerably progressive measuring method and is used commonly in Europe and America. However, such method does not strictly limit the machinery accuracy of elevators and rotating plates. This method obtains an easy use and a high detecting accuracy, so the application of 3D becomes a mainstream in the market.

Likewise, 3D scanning is an innovative technique which combines the light, machinery, electricity, and computer integrally for scanning the spaces, shapes, structures, and colors of the object in order to obtain a space coordinate of the surface of the object. The main purpose of 3D is to convert the three-dimensional data of the object into the digital signals which can be directly processed by the computer, thereby providing a considerably convenient and rapid technique for the digitization of the solid object.

The 3D canning technique carries out the non-contact measurement and provides the fast speed and high accuracy. The measuring results can be directly associated with various software interfaces. Consequently, the 3D scanning technique becomes popular among the application of CAD, CAM, and CIMS. In manufacturing trades of developed countries, the 3D scanner is used as rapid three-dimensional measuring equipment because of its rapid speed of measurement, high accuracy, non-contact feature, and convenient use, so the 3D scanner has more and more applications. The 3D scanner is used to scan the hand boards, samples, and models to obtain the 3D dimension data, and these data can be directly associated with the interfaces of CAD and CAM, whereby the CAD system adjusts and repairs the data and then sends the date to the processing center or fast shaping equipment for manufacturing. Therefore, the cycle of manufacturing products can be greatly shortened.

The worldwide equipment mostly uses the machinery with XY axes as a rule to measure or applies a high-grade automobile producing dynamic laser to measure. The procedures of the aforementioned methods are complicated and have high manufacturing costs, which is not suitable for the development of popularizing automobiles.

Recently, the common clamps associated with the 3D techniques of four-wheel aligner worldwide are used to clamp the target of graphic for measuring are described as follows:

A: multi-point pin-shaped clamp: in the quick clamp of BMW 175-348-1 and is also used in the quick clamp of 175-541-1, a pin which is 120 millimeters long is applied to some special and deep wheel rims and wheel hubs with retracting holes. The clamp is mainly suitable for high-class vehicles, for example, BMW and Mercedes-BENZ. In the field of four-wheel aligner, some special models of vehicles need the assistance of special clamps to finish the measurement of the four-wheel aligner, such as Mercedes-BENZ and BMW in German vehicles brands. The clamp used in these two vehicles needs to cooperate with the originally manufactured wheel rim. The wheel rims of Mercedes-BENZ and BMW are designed to define measuring holes beside the fixing screws for allowing the special clamp to insert into the holes and position and using the grip to fix the clamp on the rim. This method makes the axis of the four-wheel aligning sensor and the axis of wheel hub overlap and accurately measures the front angle and the outward inclined angle by having the horizontal surface and the vertical surface to more close attached to the actual situation of the wheels. By the aforementioned method, the program of eccentricity compensation can be omitted to increase the efficiency. As it should be, the specific measuring procedures and measuring tools are needed at the same time. For example, Mercedes-BENZ needs the measuring tools of ROMESS and the expanding tools of front angle. Haekeye Elite of HUNTER is an object which combines the clamp and the reflecting board of the conventional 3D aligner for being installed on surface of any rim of wheels. It has a width to be set at one third of the conventional 3D aligner and is amended into a surface contact to replace three-point or four-point contact of the conventional aligner; consequently, the efficiency is much higher while clamping, and the effect of "universal clamp" is conducted in the surfaces of wheel hubs with varied shapes.

B: Three-point clamp: The shape of the clamp is similar to a Y shape, and the material of its three points is hard plastic. The quick aligning clamp completes the action by using a positioning pin and a clamping arm. During the installation of the clamp, the wear of the clamp should be decreased possibly. By the change of the size of the circle defined by the three points, the clamp can be adapted to wheels with varied specifications. According to the marked size of the wheels, the user has to adjust two grips which are in the lower positions, lodge them in the border of the rim, move and fasten the grips on the top to the wheel tire edge by a heart-shaped shaft, put an adjustable clamping arm on the wheel, press down the fastening levers at two sides toward the direction of the wheel forcibly, move the clamping arm to the tire tread, and then make sure that the two ends are well adjusted before loosening the clamping arm.

C. Four-point clamp: This clamp is used in the wheels made of steel aluminum alloy of which the size is set from 10" to 28". The slide of the clamping arm can be automatically leveled at the middle, and the needed size is obtained by rotating the star nut tightly. The gripping grip and the pressure piece with rubber pad allow the clamp to be installed on all wheels, including alloyed wheels with irregular shapes. While using, the eccentricity compensation of the wheel rim must be executed, whereby it can adapt to all wheels.

The four-point clamp as shown in FIG. 1 is a present technique which is a target clamp 2' for installing the target board. The circumference of the target clamp 2' is supported against the interior edge of the wheel tire 1'. The target board is installed on the target clamp 2'. The target clamp 2' can be slightly adjusted for adjusting the target board at the center of the tire 1'. However, the present target clamp 2 has a complicated installation, a big volume, heavy weight, and high repairing costs, so the procedure for adjusting the target board is complex and difficult.

Accordingly, the inventor of the present invention provides a single-point clamp of 3D vehicle four-wheel aligner (hereinafter referred to as "vehicle four-wheel aligner") and a using method thereof.

SUMMARY OF THE INVENTION

The present invention provides a 3D single-point clamp of four-wheel aligner for vehicles and a using method thereof to completely replace the traditional clamps and overcome the difficulties of the present technique. The present invention obtains a simple structure, low manufacturing costs, an easy operation for adjusting the target board with magnets, and a convenient use.

The present invention adopts the following technique:

A single-point clamp of four-wheel aligner for vehicles (each wheel needs one clamp, and a set of equipment has four clamps) connected to a fixing hub nut of a wheel hub comprising a sleeve, a single-point variable hexagonal grip, a fastening nut, a connecting board, and a measuring target board with magnets; the single-point variable hexagonal grip is disposed at one end of the sleeve, and the fastening nut is disposed at the other end of said sleeve; the single-point variable hexagonal grip being firmly lodged in the fixing hub nut disposed on the wheel hub; the sleeve being connected to a first end of the connecting board, and the target board with magnets being rotationally fastened to a second end of the connecting board.

Preferably, one end of the connecting board forms an installing hole sleeved by the sleeve, and the other end thereof is magnetically connected to the target board with magnets.

Preferably, the sleeve is firmly clamped on the installing hole of the connecting board by the fastening nut.

Preferably, the connecting board is perpendicular to the sleeve.

Preferably, the target board with magnets is a dot matrix.

Preferably, a size of the variable single-point clamp matches a diameter of the fixing hub nut.

The present invention also provides a using method of a single-point clamp of four-wheel aligner for vehicles associated with a vehicle four-wheel aligner and including steps of:

(1) loosening a fastening nut of the single-point clamp of four-wheel aligner for vehicles;

(2) inserting a single-point variable hexagonal grip of the single-point clamp of four-wheel aligner for vehicles into a fixing hub nut disposed on a wheel hub; and (3) rotationally and firmly fastening the fastening nut of the single-point clamp of four-wheel aligner for vehicles for fixing and clamping the fixing hub nut of the wheel hub.

Preferably, the present invention further includes a step of: (4) rotating a target board with magnets to align with the vehicle four-wheel aligner.

Preferably, the single-point variable hexagonal grip of said single-point clamp of four-wheel aligner for vehicles is inserted into any one of said fixing hub nuts on a vehicle wheel.

By comparison with the conventional technique, the present invention provides the single-point clamp of four-wheel aligner for vehicles and a using method thereof to have a simple structure and a quick installation, occupy small space, and obtain low-manufacturing costs and less consumption of materials. The target board with magnets is easy to be operated while adjusting, thereby obtaining a using convenience and a quick speed and largely increasing the efficiency of labor. The present invention is a pioneer worldwide by disclosing a single-point clamp of four-wheel aligner for vehicles and a using method thereof. Generally, the market all over the world adopts the three-point, four-point, multi-point methods to clamp and install, which has the problems of the complicated structure, high manufacturing costs, a big volume, the heavy weight, and no changes for the movement.

The present invention is further described upon reading following preferred embodiments in junction with the drawings.

DETAILED DESCRIPTION OF THE PREFERRED EMBODIMENTS

Figure 1:
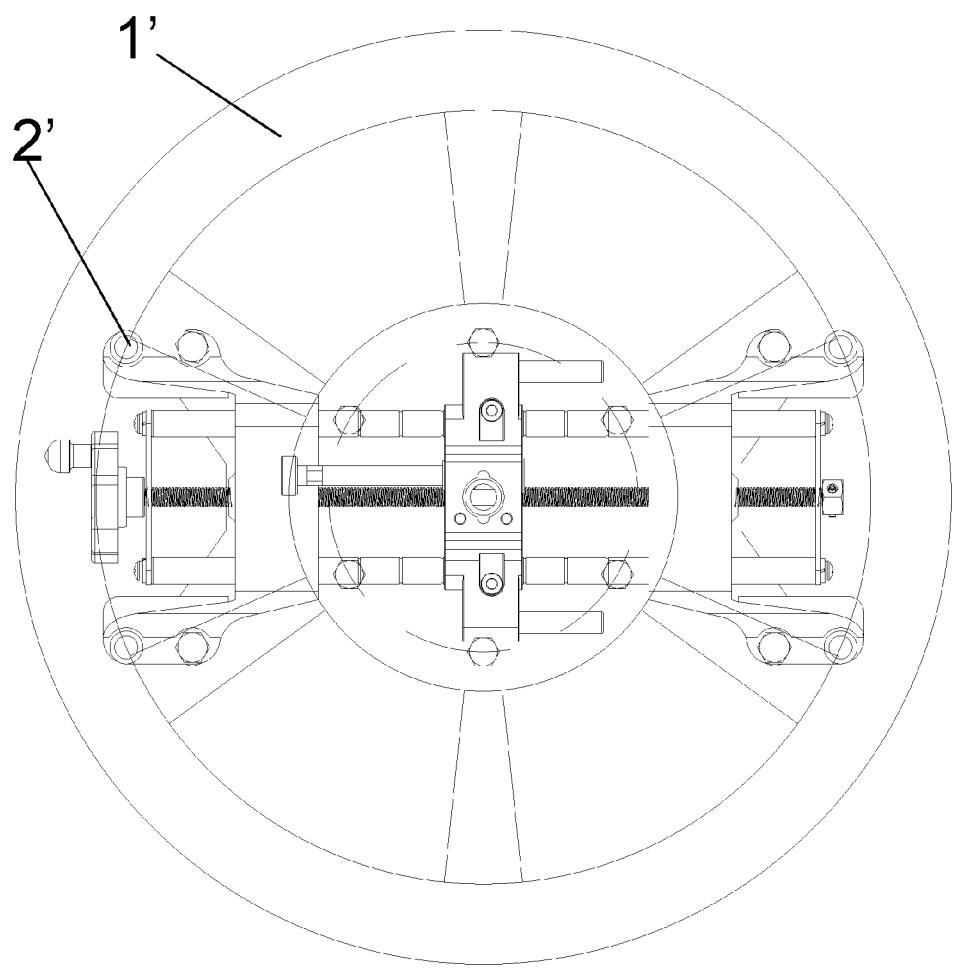
FIG. 1 is a schematic view showing the structure of the installing clamp of the present technique.
Figure 2:
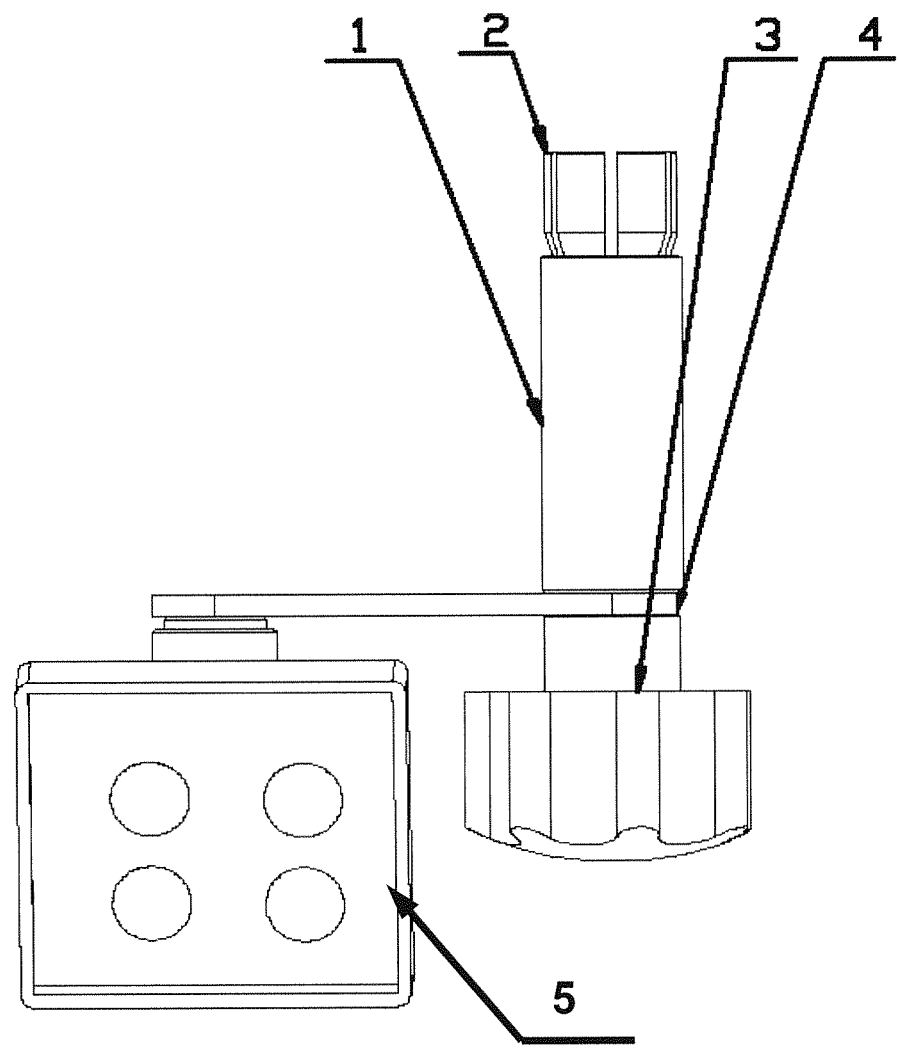
FIG. 2 is a front view showing the single-point clamp of the vehicle four-wheel positioning instrument in the embodiment.
Figure 3:
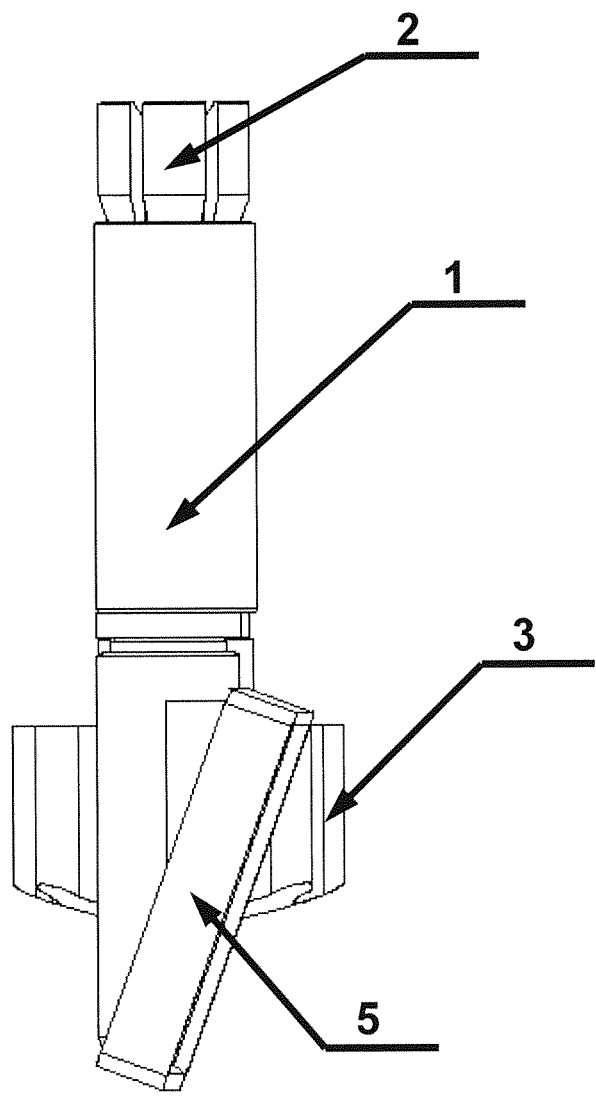
FIG. 3 is a side view showing the single-point clamp of the vehicle four-wheel positioning instrument in the embodiment.
Figure 4:
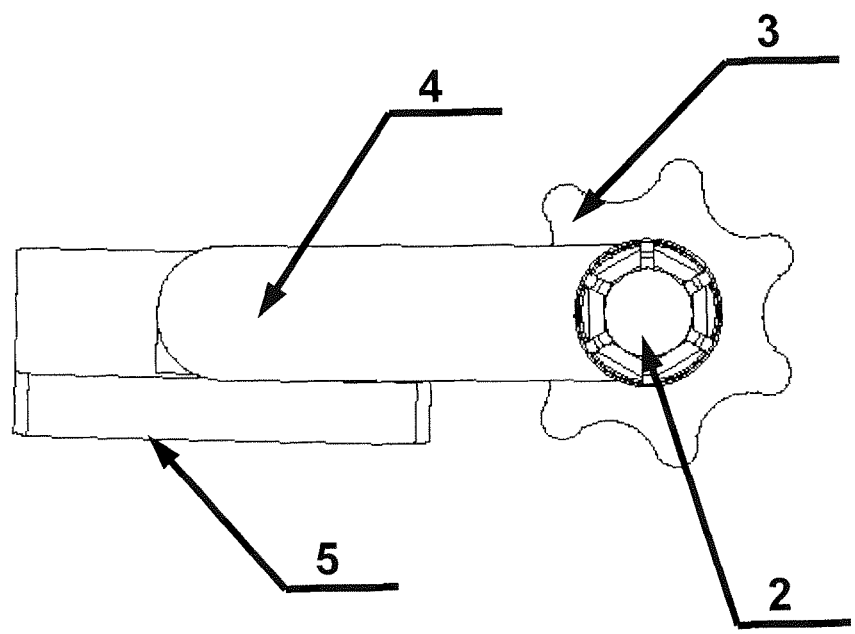
FIG. 4 is a top view showing the single-point clamp of the vehicle four-wheel positioning instrument in the embodiment.
Figure 5:
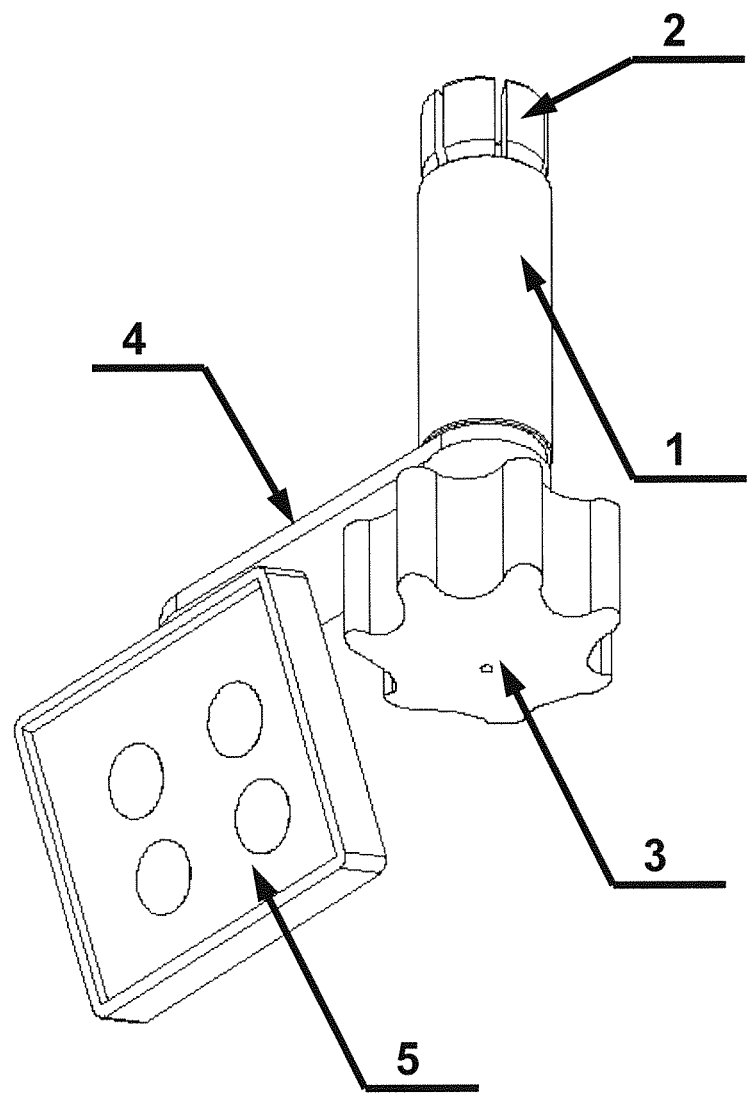
FIG. 5 is a perspective view showing the single-point clamp of vehicle the four-wheel positioning instrument in the embodiment.
Figure 6:
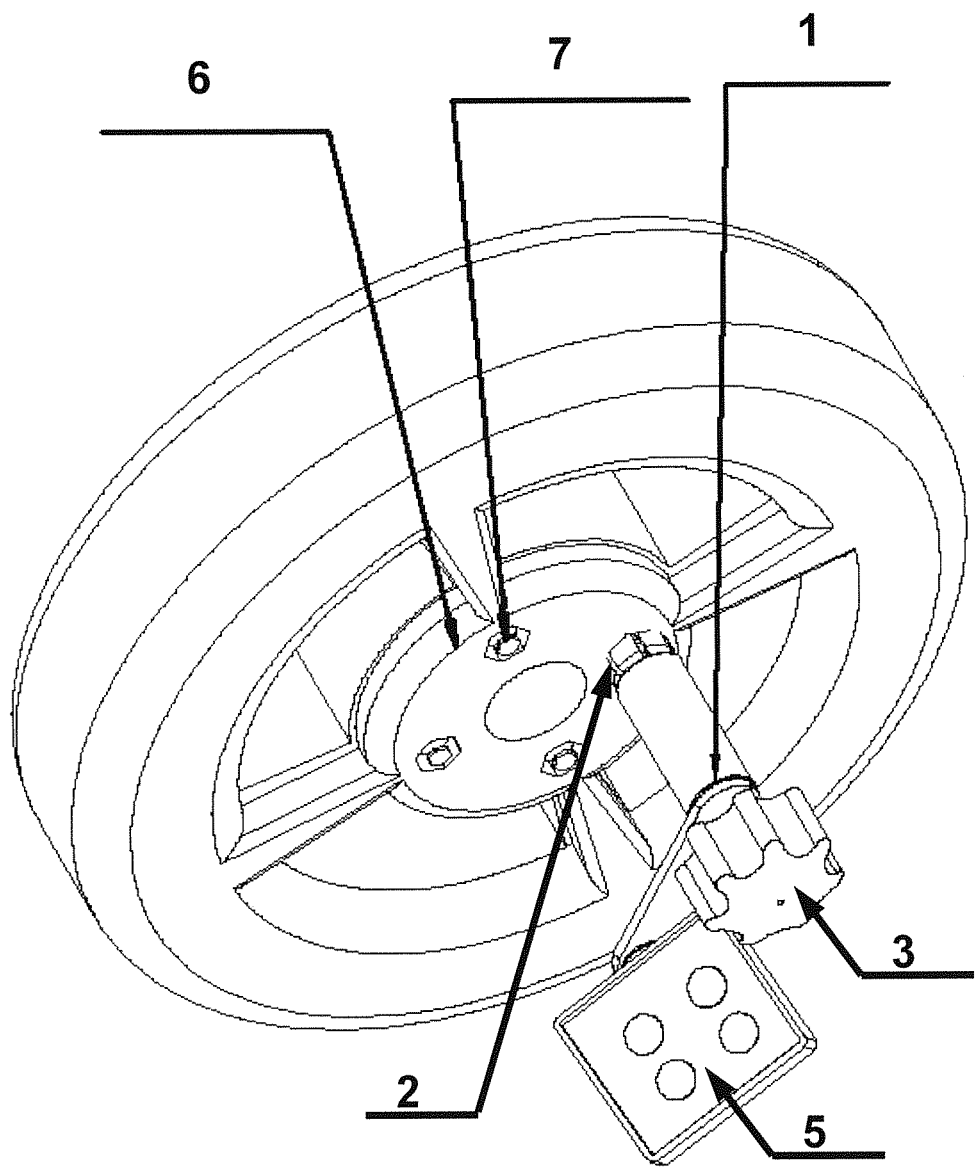
FIG. 6 is a perspective view showing the single-point clamp of the vehicle four-wheel positioning instrument in the embodiment in use.

One embodiment of the present invention is interpreted by FIG. 2 to FIG. 6.

Embodiment 1

As shown is FIG. 2 to FIG. 6, the present invention is a single-point clamp of four-wheel aligner for vehicles connected to a fixing hub nut 7 of a wheel hub 6 comprising a sleeve 1, a single-point variable hexagonal grip 2, a fastening nut 3, a connecting board 4, and a measuring target board with magnets 5; the single-point variable hexagonal grip 2 is disposed at one end of the sleeve 1, and the fastening nut 3 is disposed at the other end of said sleeve 1; the single-point variable hexagonal grip 2 being firmly lodged in the fixing hub nut 7 disposed on the wheel hub 6; the sleeve 1 being connected to a first end of the connecting board 4, and the target board with magnets 5 being rotationally fastened to a second end of the connecting board 4. One end of the connecting board 4 forms an installing hole sleeved by the sleeve 1, and the other end thereof is magnetically connected to the target board with magnets 5. The sleeve 1 is firmly clamped on the installing hole of the connecting board 4 by the fastening nut 3. The connecting board 4 is perpendicular to the sleeve 1. The target board with magnets 5 is a dot matrix. The size of the variable single-point clamp 2 matches the diameter of the fixing hub nut 7.

The present invention provides a using method of a single-point clamp of four-wheel aligner for vehicles associated with a vehicle four-wheel aligner and including steps of:

(1) loosening a fastening nut of the single-point clamp of four-wheel aligner for vehicles;

(2) inserting a single-point variable hexagonal grip of the single-point clamp of four-wheel aligner for vehicles into a fixing hub nut disposed on a wheel hub; and (3) rotationally and firmly fastening the fastening nut of the single-point clamp of four-wheel aligner for vehicles for fixing and clamping the fixing hub nut of the wheel hub.

A step is further included after finishing step (3): (4) rotating a target board with magnets to align with the vehicle four-wheel aligner.

In step (2), the single-point variable hexagonal grip of said single-point clamp of four-wheel aligner for vehicles is inserted into any one of said fixing hub nuts on a vehicle wheel.

The single-point clamp of four-wheel aligner uses an ultra-small and ultra-light target board which is in an area of 100*100 mm in actual measuring. The volume of the clamp is decreased 5 times than others, and the accuracy thereof is increased 5 times than others. The present invention greatly increases the advantage of aligning by adopting the single-point clamping method without using clamps. The present invention is a nationwide pioneer which can complete the installation of four wheels in four seconds.

Obviously, after the single-point clamp of four-wheel aligner for vehicle is fixed to the wheel hub, the present invention still has the same function as the typical regular aligning clamps. By comparison with the typical clamps, the structure of the present invention is much easier and is convenient to install. The present invention and a using method thereof adapts to various riding and commercial vehicles with varied specifications.

To sump up, by the technique as claimed, the present invention and a using method thereof obtain a simple structure, low manufacturing costs, an easy operation for adjusting the target board with magnets, and a convenient use.

While we have shown and described the embodiment in accordance with the present invention, it should be clear to those skilled in the art that further embodiments may be made without departing from the scope of the present invention.

What is claimed is:

1. A single-point clamp of four-wheel aligner for vehicles connected to a fixing hub nut (7) of a wheel hub (6) comprising a sleeve (1), a variable and universal single-point variable hexagonal grip (2), a wheel rim fastening nut (3), a connecting board (4), and a measuring target board with magnets (5);

wherein said single-point variable hexagonal grip (2) is disposed at one end of said sleeve (1), and said fastening nut (3) is disposed at the other end of said sleeve (1); said single-point variable hexagonal grip (2) being firmly lodged in said fixing hub nut (7) disposed on said wheel hub (6); and said sleeve (1) being connected to a first end of said connecting board (4), and said target board with magnets (5) being rotationally fastened to a second end of said connecting board (4).

2. The single-point clamp of four-wheel aligner for vehicles as claimed in claim 1, wherein one end of said connecting board (4) forms an installing hole sleeved by said sleeve (1), and the other end thereof is magnetically connected to said target board with magnets (5).

3. The single-point clamp of four-wheel aligner for vehicles as claimed in claim 2, wherein said sleeve (1) is firmly clamped on said installing hole of said connecting board (4) by said fastening nut (3).

4. The single-point clamp of four-wheel aligner for vehicles as claimed in claim 1, wherein a variable clamping size of said universal single-point clamp (2) matches said fixing hub nut (7) which is fixed to wheel hubs of various riding and commercial vehicles for fixing and measuring target boards.

5. The single-point clamp of four-wheel aligner for vehicles as claimed in claim 1, wherein said target board with magnets (5) is a dot matrix.

6. The single-point clamp of four-wheel aligner for vehicles as claimed in claim 1, wherein said connecting board (4) is perpendicular to said sleeve (1).

7. A method of using a single-point clamp of four-wheel aligner for vehicles according to claim 1 being associated with a vehicle four-wheel aligner and including:

(1) loosening a fastening nut of said single-point clamp of four-wheel aligner for vehicles;

(2) inserting a single-point variable hexagonal grip of said single-point clamp of four-wheel aligner for vehicles into a fixing hub nut disposed on a wheel hub; and (3) rotationally and firmly fastening said fastening nut of said single-point clamp of four-wheel aligner for vehicles for fixing and clamping said fixing hub nut of said wheel hub.

8. The method of using as claimed in claim 7 further including:

(4) rotating a target board with magnets to align with said vehicle four-wheel aligner.

9. The method of using as claimed in claim 8, wherein said single-point variable hexagonal grip of said single-point clamp of four-wheel aligner for vehicles is inserted into any one of said fixing hub nuts on a vehicle wheel.

10. The method of using as claimed in claim 7, wherein said single-point variable hexagonal grip of said single-point clamp of four-wheel aligner for vehicles is inserted into any one of said fixing hub nuts on a vehicle wheel.

* * * * *